United States Patent
Kollmuss et al.

(10) Patent No.: US 11,772,902 B2
(45) Date of Patent: Oct. 3, 2023

(54) DEVICE AND METHOD FOR THE TREATMENT AND/OR HANDLING OF PIECE GOODS MOVED IN AT LEAST ONE ROW

(71) Applicant: Krones Aktiengesellschaft, Neutraubling (DE)

(72) Inventors: Manuel Kollmuss, Raubling (DE); Thomas Hensel, Aying (DE); Thomas Lehner, Geisling (DE)

(73) Assignee: KRONES Aktiengesellschaft, Neutraubling (DE)

( * ) Notice: Subject to any disclaimer, the term of this patent is extended or adjusted under 35 U.S.C. 154(b) by 0 days.

(21) Appl. No.: 17/633,623

(22) PCT Filed: Jul. 21, 2020

(86) PCT No.: PCT/EP2020/070515
§ 371 (c)(1),
(2) Date: Feb. 8, 2022

(87) PCT Pub. No.: WO2021/023504
PCT Pub. Date: Feb. 11, 2021

(65) Prior Publication Data
US 2022/0315350 A1   Oct. 6, 2022

(30) Foreign Application Priority Data
Aug. 8, 2019   (DE) .................. 10 2019 121 429.7

(51) Int. Cl.
*B65G 47/08*   (2006.01)
*B65G 21/20*   (2006.01)
(Continued)

(52) U.S. Cl.
CPC ....... *B65G 47/086* (2013.01); *B65G 21/2072* (2013.01); *B65G 43/08* (2013.01);
(Continued)

(58) Field of Classification Search
CPC .. B65G 47/086; B65G 61/00; B65G 21/2072; B65G 43/08; B65G 47/905;
(Continued)

(56) References Cited

U.S. PATENT DOCUMENTS 6,559,617 B2   5/2003   Kim
9,051,071 B2   6/2015   Perl et al.
(Continued)

FOREIGN PATENT DOCUMENTS

AU   2016320325 B2   9/2021
CN   201543166 U   8/2010
(Continued)

OTHER PUBLICATIONS

PCT Application: PCT/EP2020/070515 Filed Jul. 21, 2020—International Preliminary Report of Patentability dated Feb. 17, 2022.
(Continued)

*Primary Examiner* — Gregory W Adams
(74) *Attorney, Agent, or Firm* — Simmons Perrine Moyer Bergman PLC

(57) ABSTRACT

The invention relates to a handling device or layer forming device (10) and a method for forming piece good layers. Piece goods (14) are conveyed on a horizontal conveying device (16) to a grouping station and/or layer forming station (12) comprising a manipulator (20). In a work cycle, the manipulator (20) seizes at least one piece good (14) and moves it into a target position or target alignment, in particular with regard to a piece good layer to be formed. The horizontal conveying device (16), which is arranged upstream of the grouping station and layer forming station (12), comprises at least one sensor device (24) for obtaining positional data or dimensional data or alignment data of the transported piece goods (14). Based on the obtained data, the (Continued)

control device (28) controls the movements of the manipulator (20) within the movement range for the purpose of the layer formation.

15 Claims, 8 Drawing Sheets

(51) Int. Cl.
  *B65G 43/08* (2006.01)
  *B65G 47/90* (2006.01)
  *B65G 61/00* (2006.01)
  *G01S 15/06* (2006.01)

(52) U.S. Cl.
  CPC ........... *B65G 47/905* (2013.01); *B65G 61/00* (2013.01); *G01S 15/06* (2013.01); *B65G 2203/0233* (2013.01); *B65G 2203/042* (2013.01); *B65G 2203/044* (2013.01)

(58) Field of Classification Search
  CPC ...... B65G 2203/0233; B65G 2203/042; B65G 2203/044; G01S 15/06
  See application file for complete search history.

(56) References Cited

U.S. PATENT DOCUMENTS

| | | | |
|---|---|---|---|
| 9,845,205 B2 | 12/2017 | Keller | |
| 11,053,082 B2 | 7/2021 | Winzinger et al. | |
| 2016/0096274 A1 | 4/2016 | Baylor et al. | |
| 2016/0362258 A1 | 12/2016 | Anders et al. | |
| 2019/0308823 A1* | 10/2019 | Beer | B65G 65/02 |
| 2020/0039756 A1* | 2/2020 | Kollmuss | B25J 9/0093 |

FOREIGN PATENT DOCUMENTS

| | | | | |
|---|---|---|---|---|
| CN | 104251683 A | 12/2014 | | |
| CN | 108007309 A | 5/2018 | | |
| DE | 3607858 A1 | 9/1987 | | |
| DE | 102013202872 A1 | 8/2014 | | |
| DE | 102016211281 A1 | 12/2017 | | |
| DE | 102017002752 A1 | 9/2018 | | |
| DE | 102017205001 A1 | 9/2018 | | |
| DE | 102017118928 A1 | 2/2019 | | |
| JP | S5830612 U | 2/1983 | | |
| JP | 2013107119 A | 6/2013 | | |
| WO | 2004076319 A1 | 9/2004 | | |
| WO | 2017141066 A1 | 8/2017 | | |
| WO | WO-2017220214 A1 * | 12/2017 | ........... | B65G 47/086 |
| WO | WO-2018015029 A1 * | 1/2018 | ............. | B65G 43/08 |
| WO | WO-2018095581 A1 * | 5/2018 | ............. | B65B 57/08 |
| WO | WO-2018108326 A1 * | 6/2018 | ............. | B25J 9/0093 |

OTHER PUBLICATIONS

PCT Application: PCT/EP2020/070515 filed Jul. 21, 2020—International Search Report dated Feb. 1, 2021.
PCT Application: PCT/EP2020/070515 filed Jul. 21, 2020—Preliminary Partial Search Report dated Oct. 26, 2020.
Priority Application: DE 10 2019 121 429.7 filed Aug. 8, 2019—German Search Report dated Jun. 17, 2020.
Chinese Application First Office Action dated Mar. 8, 2023.

\* cited by examiner

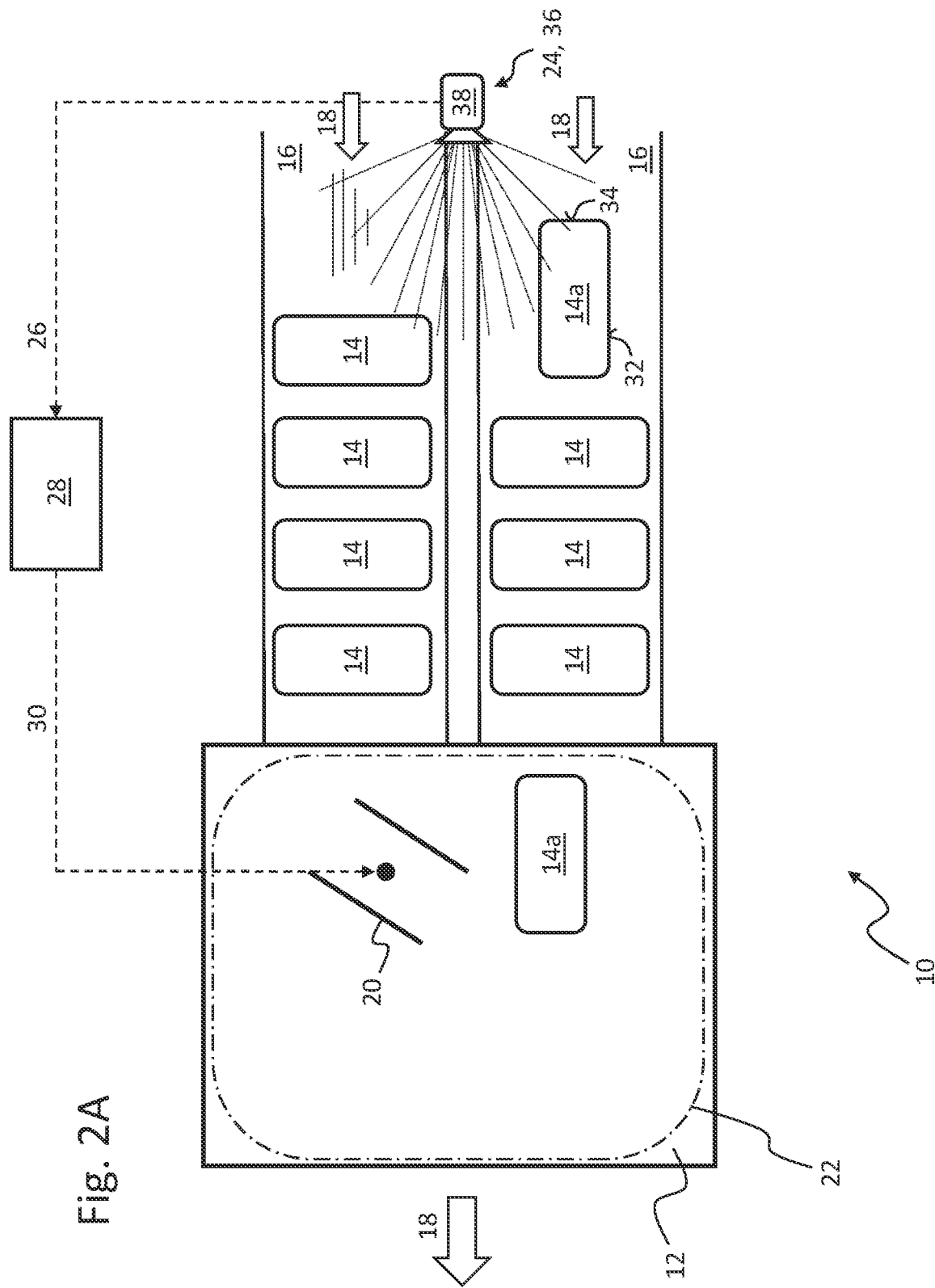

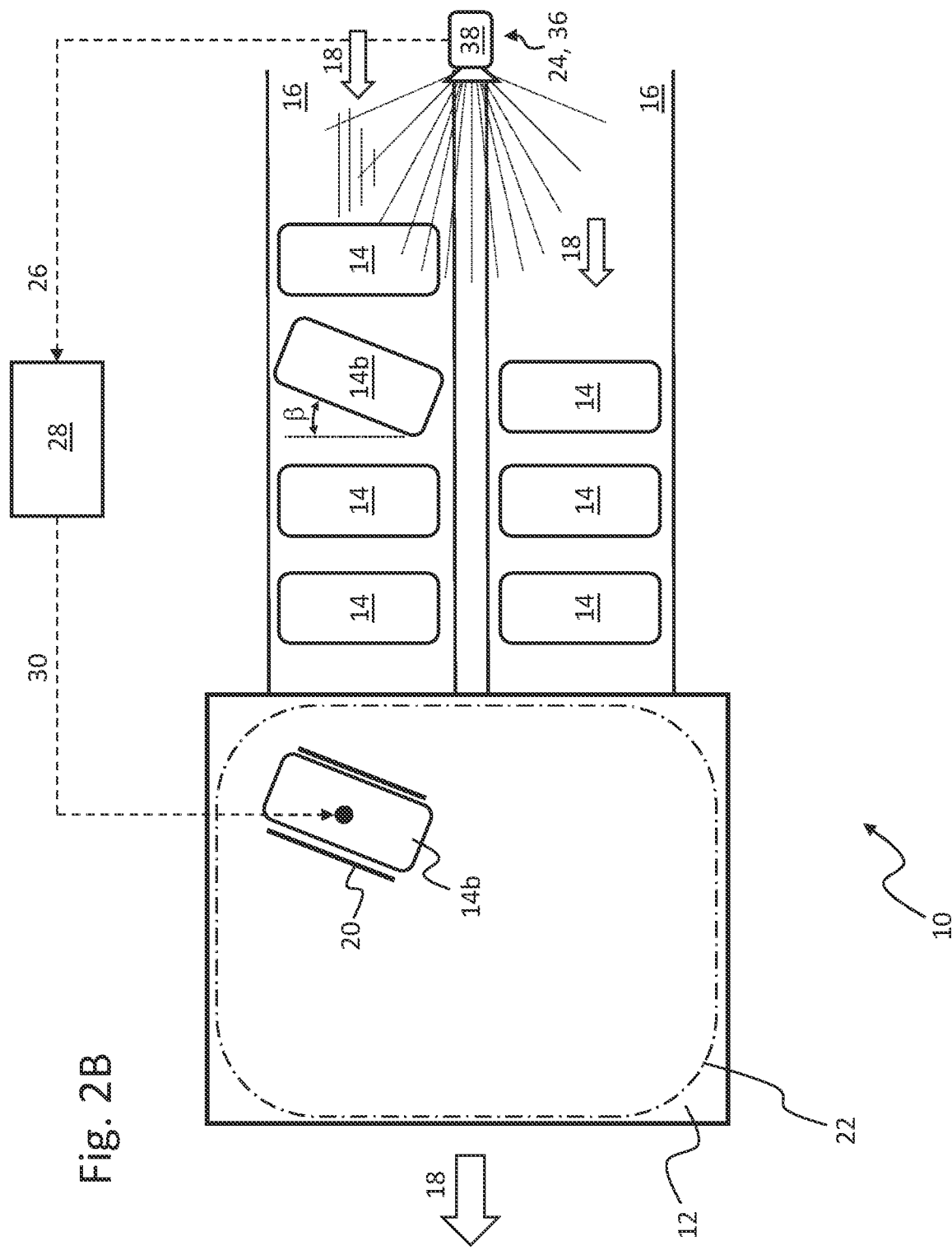

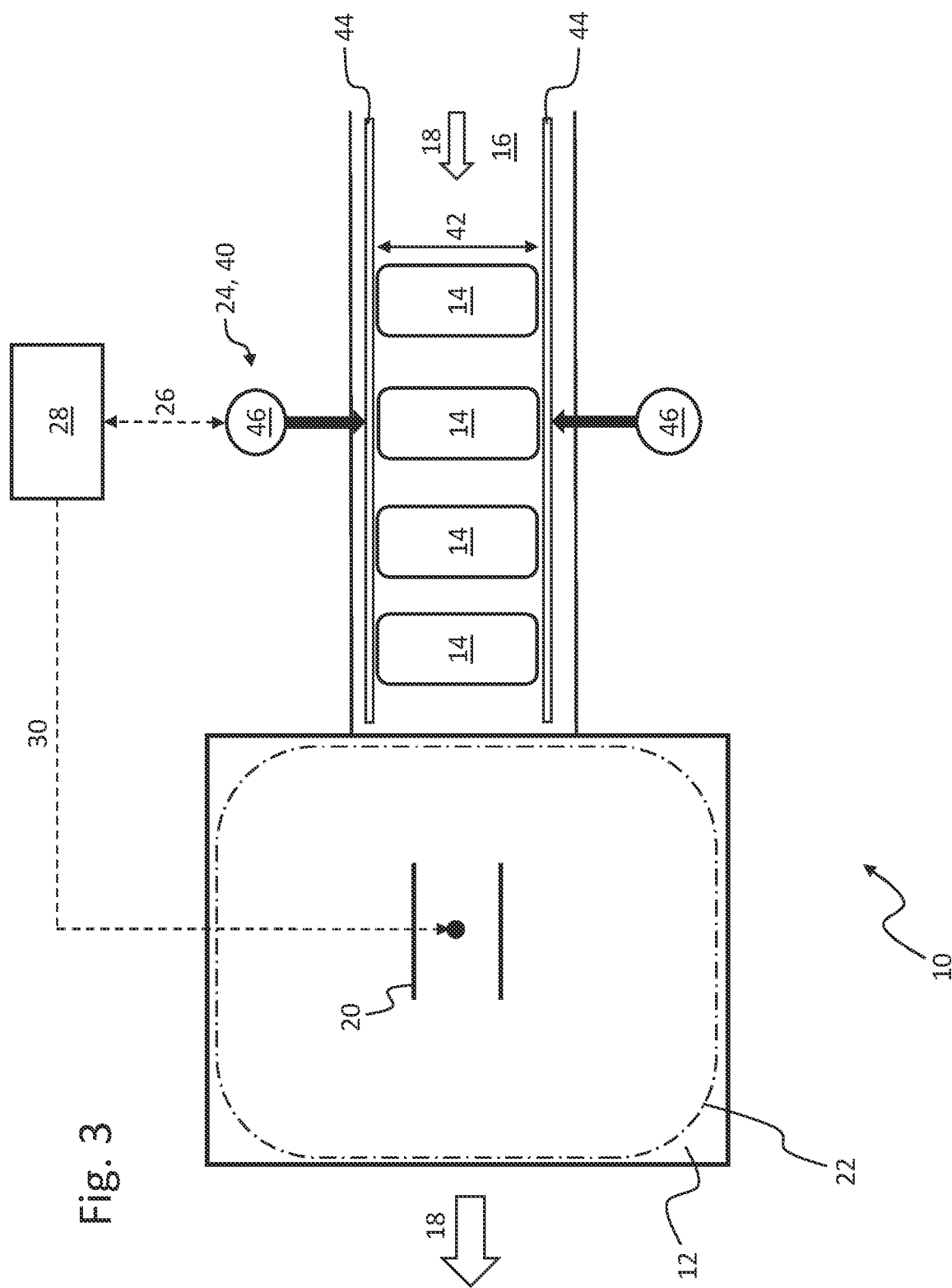

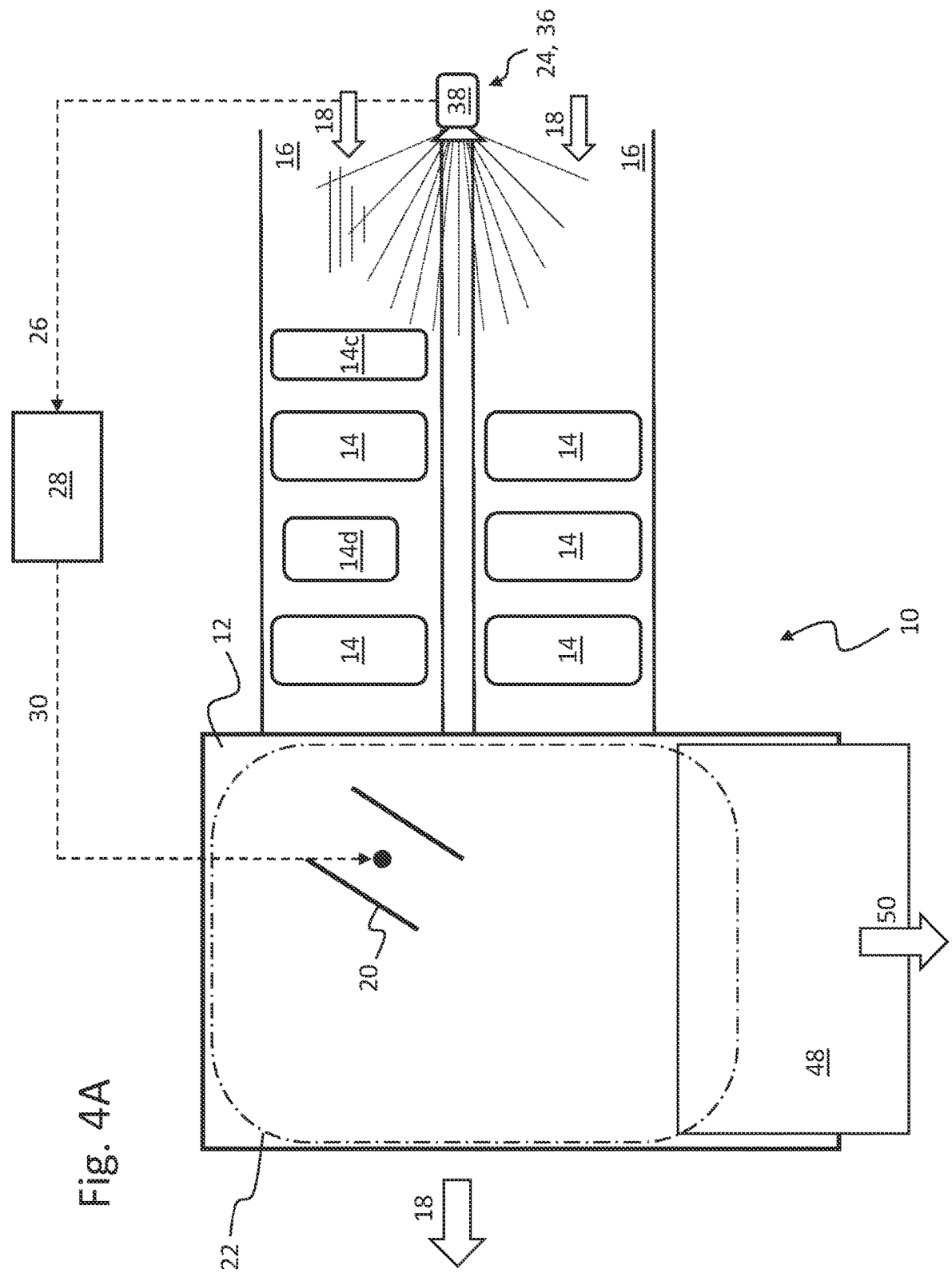

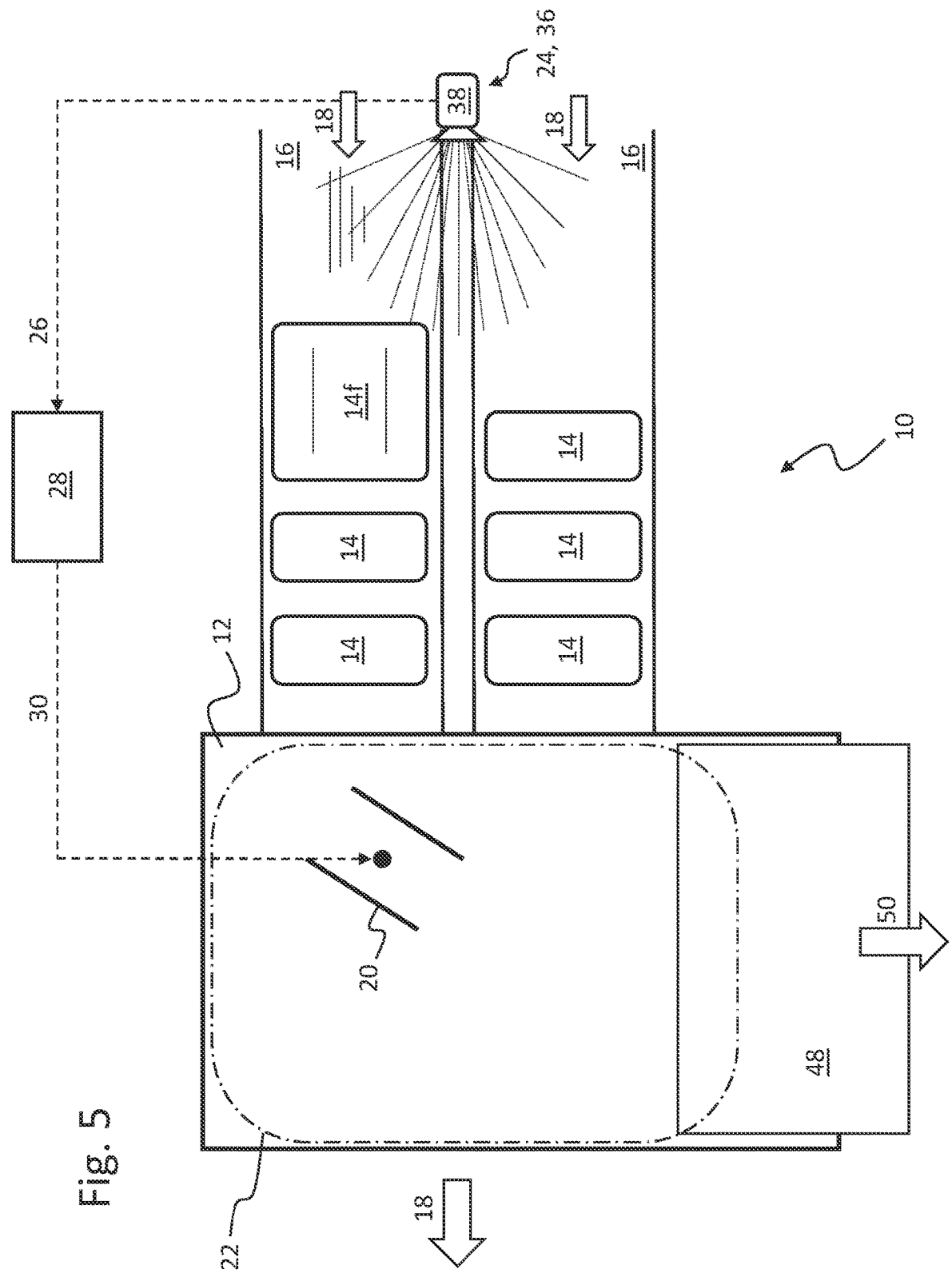

DEVICE AND METHOD FOR THE TREATMENT AND/OR HANDLING OF PIECE GOODS MOVED IN AT LEAST ONE ROW

CLAIM OF PRIORITY

The present application claims priority to International Application PCT/EP2020/070515 filed Jul. 21, 2020, which in turn claims priority to German Application DE 10 2019 121 429.7 filed Aug. 8, 2019, which are incorporated by reference.

FIELD OF THE INVENTION

The present invention relates to a method as well as a device for the treatment and/or the handling of piece goods moved in at least one row according to the characteristics of the independent claims.

BACKGROUND OF THE INVENTION

In known processes for packaging and/or palletizing piece goods such as packages, containers or the like, these are first conveyed on transport devices, which transport devices are conveying in lines, and are shifted, aligned and/or arranged into layers in a suitable manner in order to create desired layer patterns so that these piece good layers, which generally have a rectangular layout, can then be stacked several times on top of one another, for example on pallets, that are prepared for this purpose. These treatment steps can be used in particular in systems for the treatment of beverage containers. The piece goods in question may, for example, be packets, crates, cartons, containers or clusters.

For the mentioned pallets to be safe for transport, the assembled layer patterns, which are also referred to as assembled cycles, have to meet certain requirements. In order to form such cycles, it is customarily necessary to perform preparatory procedures, which consist, for instance, in first conveying piece goods regularly or stepwise on a so-called dosing belt, in then grouping or gathering them on an intermediate transport belt, and in delivering them together and/or in groups from there to a layer-forming belt or a layer-forming table.

Such layer forming tables, also referred to as grouping tables, which serve to bring together piece goods such as, for example, cartons, shrink packs, trays or plastic crates, can be designed in different ways. For example, piece goods can be brought together by placing them in a two-dimensional formation (block formation, e.g. pallet layer). For this purpose, for example, a roller track can be supplied in linear conveying direction or in parallel conveying directions from one lane or from several lanes. According to demand the piece goods can be mechanically arranged in the required position each in front of or on the roller conveyor by stopping point. The piece goods positioned in this way can then be pushed off the roller conveyor orthogonally to the direction of transport. The supplying, the positioning and the pushing off of the piece goods can be considered as one cycle. At least one cycle is required to form a layer, although several cycles are normally required.

The partially discontinuous conveying with its relatively abrupt changes in speed and/or changes in direction or also other influences not mentioned here can lead to individual piece goods getting at least slightly out of their cycle or out of their normally assumed position and consequently possibly being inaccurately positioned during layer formation.

In order to avoid or reduce these inaccuracies or to at least avoid negative effects in the layer formation process, there are basically several possibilities available in order to be able to detect misalignments, such as the mechanical scanning of the positions of transported piece goods.

Such a mechanically operating measuring device for detecting changes in the accumulation position during an accumulation process of bottles or other containers transported on a multi-lane conveyor belt is known, for example, from DE 36 07 858 A1. The measuring means is located at a lateral railing section and is formed by a tactile element which protrudes from the guiding side of the railing section into the transport path with the transported bottles.

Another mechanically operating measuring device with a pivotable and pendulum-mounted tactile element for sensing a product flow is known from WO 2017/141066 A1. The position of the pivoting tactile element, which position is influenced by the product flow, is detected by a sensor.

Since such mechanically operating sensors quickly reach their limits with regard to their accuracy, but also with regard to the processing speeds that can be achieved with them, electronically operating sensor devices are often also used to detect the positions and/or alignments of transported piece goods. If not only misalignments of transported piece goods are to be detected, but the transported piece goods are also to be aligned, an alignment device is suitable for this purpose, such as the one disclosed in WO 2004/076319 A1. Thereby, the positions of the piece goods as well as their dimensions and alignments are detected by sensors, after which the piece goods are acted upon actuatorily in order to bring them into a desired target alignment or target positioning.

DE 10 2013 202 872 A1 discloses a method for aligning and/or grouping piece goods, which piece goods are conveyed in a row one behind the other to a grouping station, and in which grouping station the piece goods are contacted and displaced and/or rotated on a lateral surface by a manipulator, which manipulator is movable and/or rotatable in the horizontal direction. The manipulator comprises a rod, the movement course of which rod is controlled during the displacement and/or rotation process of a respective piece good based on the signals of an optical sensor or a camera with downstream image processing.

A method for seizing and selectively eliminating individual piece goods that are transported one behind the other on a flat conveyor element is disclosed by WO 2016/023135 A1. Positioning information of the piece goods is continuously detected optically and piece goods to be eliminated are laterally pushed out of the transport path of the remaining piece goods by a pusher.

DE 10 2017 002 752 A1 further discloses a device and a method for handling piece goods to form a palletizable layer, which piece goods are moved in a row one behind the other. The piece goods, which are coming from a packaging machine, are transported at a distance from each other and are fed via a horizontal conveying device to a grouping module, which grouping module has a seizing range for the piece goods with a manipulator, which manipulator is moving within the seizing range. The manipulator can seize the piece goods individually or in groups and, by displacement and/or rotation, bring them into a defined target position and/or target alignment, which target position and/or target alignment corresponds to a defined position within a palletizable piece good layer. For the movement control of the manipulator, output signals of an optical sensor can be evaluated, which optical sensor detects spatial coordinates and/or positions of the piece goods.

In view of the known prior art, it can be regarded as a primary objective of the invention to provide a handling device for piece goods, which piece goods are moved in at least one row, which handling device is capable of individually adjusting different control parameters of a manipulation device by sensory detection of piece good parameters upstream or downstream of the manipulation device, so that a reliable seizing, handling and, if necessary, grouping of the piece goods by the manipulation device can be ensured, even in the event of deviations between a desired state of the piece goods and their actual state. It is also an aim of the invention to provide a corresponding method for handling piece goods moved in at least one row.

SUMMARY OF THE INVENTION

The above objectives of the invention are achieved by the objects of the independent claims. Further advantageous embodiments are described by the respective dependent claims.

In order to achieve the aforementioned objectives, the present invention proposes a method for the treatment and/or the handling of piece goods moved one after another in at least one row, in particular in connection with and for the purpose of forming piece good layers of defined size, which piece good layers can subsequently be stacked several times on top of each other and above each other. Hereby, the piece goods of a row, which piece goods are moved one behind the other, can in each instance have approximately identical or different distances from one another, optionally also variable distances from one another. According to the method, piece goods are fed from an upstream packaging station and/or equipping station, which packaging station and/or equipping station is not specified in more detail herein, by at least one horizontal conveying device to a grouping station and/or layer forming station, where the piece goods are displaced, rotated or otherwise manipulated individually or several, in order to obtain their respective position and alignment within the respective intended layer pattern.

The grouping station and/or layer forming station comprises a seizing range, which seizing range on the one hand defines the space into which the piece goods are delivered. On the other hand, the seizing range defines a movement range of at least one manipulator and/or limits this movement range of the at least one manipulator in spatial terms, by which movement range is primarily meant a range or a sensible or constructively predetermined radius of movement of the manipulator. If, in this context, reference is made quite generally to a manipulator, this may in particular be a movably suspended gripper arm of a gantry robot, of a multi-axis movable robot, of a parallel kinematic robot or the like, which gripper arm is controllable within the defined movement range, wherein the gripper arm can in particular have gripping jaws, which gripping jaws can be advanced towards one another, so that the gripper can grip, seize, displace, lift, rotate and bring individual piece goods, pairs or groups of piece goods into desired target positions and/or target alignments in order to release them there by opening the advanceable gripping jaws and subsequently move on towards the piece goods to be subsequently manipulated.

A conveyor support moving in extension of the transport direction of the horizontal conveying device can optionally be assigned to the grouping station and/or layer forming station, so that the manipulator removes the piece goods from the support surface that is moving continuously in the transport direction and rotates and/or displaces them in the desired manner. Such a support plane moving in the transport direction can be formed, for example, by a mat chain, by a link chain or by an alike endlessly circulating conveyor plane.

However, variations are also possible, in which variations no additional conveying device is assigned to the seizing range of the grouping station and/or layer forming station, so that the piece goods are pushed by the horizontal conveying device under the effect of dynamic pressure onto a relatively smooth surface of the grouping station and/or layer forming station and there are initially brought into the desired layer pattern exclusively by the manipulator moving in rapid succession. Since, however, a further transport of the thus formed piece good layer from the grouping station and/or layer forming station to downstream processing stations is necessary, in such a variation, for example, a thrust bar or the like can be used, which pushes each completely assembled piece good layer to a downstream processing station. This can optionally take place in extension of the original transport direction defined by the infeeding horizontal conveying device or also transversely thereto, if, for example, the processing station downstream of the grouping station and/or layer forming station is located laterally adjacent to the seizing range with the manipulator.

In a working cycle the at least one manipulator can thus grippingly seize at least one piece good from the at least one row and move it into a defined relative target position and/or target alignment, in particular with respect to a piece good layer to be formed. Such a piece good layer generally has a square or rectangular layout with straight lateral edges and preferably no or only slight gaps between the piece goods assembled in this manner within the layer pattern. However, individual smaller gaps can occur depending on the contours of the piece goods to be manipulated, for example, if these have rectangular layouts and the layer pattern is created by an overall irregular appearing sequence of differently rotated piece goods.

Since the movement controls of the manipulators used for the purpose of forming layers as quickly as possible, which is the aim here, must be very precise, it is also necessary to convey the piece goods into a position within the movement range of the manipulator as precisely as possible, which position is in each instance exactly fitting for the quick and exact seizing by the manipulator. For this reason, it has proven necessary in practice to make the piece goods available to the manipulator as far as possible without any or with only very slight deviations in their position, orientation and alignment. If this cannot be guaranteed, the known state of the art suggests either correcting the position of a skewed or twisted piece good or, if necessary, eliminating it, which on the other hand, however, creates an unexpected gap within the row of piece goods, which gap may possibly lead to problems in forming a complete piece good layer.

In order to enable even faster layer formation, the present invention proposes another solution approach, which assigns to the manipulator, which is normally only responsible for layer formation in the narrower sense, the additional task of including in this layer formation process also those piece goods, which piece goods would normally have to be corrected or manipulated beforehand with respect to their orientation, positioning and/or with respect to other deviations from a desired state or which piece goods, in certain cases, would even have to be eliminated due to an excessive deviation from a desired state or a desired position.

In order to enable the manipulator within the short time available to also seize such piece goods and to include them in its uninterrupted layer forming process, at least one sensor device is assigned to the horizontal conveying device, which sensor device is designed for optical and/or electromagnetic wave-based and/or mechanical and/or other acquisition of positional data and/or dimensional data and/or alignment data with respect to the piece goods transported on the horizontal conveying device, which horizontal conveying device is arranged upstream of the grouping station and/or layer forming station in the transport direction of the piece goods. Hereby, it is provided that the sensor device generates electronic output signals from the obtained positional data and/or dimensional data and/or alignment data of the piece goods transported on the horizontal conveying device. These output signals are processed and used to control the manipulator in accordance with the detected piece good positions and/or dimensions and/or orientations, in particular with regard to a respective piece good layer to be formed by the manipulator.

The sensor device used in the method according to the invention can, for example, be designed in such a way that it can detect the piece goods within the region of the horizontal conveying device by image processing. In this variation of the method, an optical detection device and/or sensor device can thus be used, which senses the piece goods in particular by image processing. Optionally, the sensor device may comprise at least one camera and/or at least one line sensor.

A variation of the method is also conceivable, in which method the sensor device detects the piece goods within the region of the horizontal conveying device by transmitting and processing ultrasonic signals. In this variation of the method, a detection device and/or sensor device operating with ultrasound can thus be used, which detects the piece goods by ultrasound signal processing.

Furthermore, the method can be designed in such a way that the sensor device comprises at least one reflective scanner projecting into the transport path of the piece goods on the horizontal conveying device. In this case, the piece goods in the transport path are scanned by mechanical means, which can advantageously be affected by a reflective scanner or the like tactile devise, which transport path is arranged upstream of the seizing range comprising the manipulator movable therein.

In order to leave sufficient time for the indispensable signal processing required for the evaluation of the positional data, alignment data and/or state data obtained by the sensor device of the piece goods transported via the horizontal conveying device to the seizing range of the grouping station and/or layer forming station, in the method according to the invention the sensor data are obtained in a region upstream of the grouping station and/or layer forming station and in a region of the horizontal conveying device, which region has a sufficient minimum distance from the grouping station and/or layer forming station. Thus, with a sufficiently fast evaluation and subsequent processing of the signals, reliable control commands for the manipulator can be generated, which manipulator is movable within the seizing range, wherein these control commands for the manipulator are adapted to the actual positions and/or actual alignments and/or actual states of the piece goods thus optically, mechanically and/or ultrasonically scanned and detected, which actual positions and/or actual alignments and/or actual states are possibly deviating from a desired state. In this way, even piece goods which are standing in a slanting position, which are laterally displaced or which even have fallen over, can be included within the layer formation process without any problems, without the requirement of additional actuators or manipulators and without the undesirable need to eliminate individual piece goods, which piece goods can be seized by the manipulator without any problems despite their positional deviations or alignment deviations by modifying the positional setting of the manipulator accordingly.

In all variations of the method, it is provided that the manipulator moves individual or a plurality of piece goods within its seizing range within the grouping station and/or layer forming station on the basis of the output signals obtained and processed by the sensor device, which output signals are subsequently made available to a control device of the manipulator, and/or in that the manipulator is moved in a corresponding manner together with the seized piece goods, so that, by successive rotational movements and/or displacement movements, largely closed layer patterns are formed from the piece goods, which layer patterns can be transferred in a subsequent process step, for example, onto a pallet and/or can be stacked there in a plurality of layers arranged above each other.

Depending on the degree of deviation of the positions, alignments and/or of the state of the piece goods to be manipulated, the method may further provide, that the manipulator merely corrects and/or changes the positions of individual piece goods or a plurality of the piece goods conveyed to the seizing range on the horizontal conveying device; the manipulator acting on the basis of the output signals obtained and processed by the sensor device and made available to a control device of the manipulator in such a way, that a desired position of the respective piece good in the targeted layer pattern is achieved. For individual piece good positions a grasping and displacement and/or rotation by the manipulator can be dispensed with, namely if the piece good concerned or a plurality of piece goods concerned are assigned a target position within the layer pattern, which target position is located in extension of the transport path of the horizontal conveying device, so that neither a rotation nor a lateral displacement out of the rectilinear transport path is necessary for this piece good or for these piece goods.

In this variation of the method, a skewed position of a piece good, a lateral displacement of a piece good or a fallen over piece good is just as much an obstacle to the formation of a perfect piece good layer as in the manipulation variations described above, so that here too a corresponding corrective intervention by the manipulator may be necessary, which intervention would not be necessary in the case of piece goods being in a perfect position. The detection of the piece good positions or alignments and/or the respective rotational position and/or the respective state of the piece goods enables a respective control of the manipulator for such a corrective action and corrective intervention before the piece good being released again and left to its further transport path.

However, if by the evaluation of the output signals it is recognized, that such corrective interventions by the manipulator cannot lead to the desired success, for example, because a piece good is more deformed or damaged or otherwise no longer appears to be suitable for use in the intended piece good layer, the method according to the invention can also provide, that based on the output signals obtained and processed by the sensor device and made available to a control device of the manipulator, the manipulator seizes individual or several of the piece goods within the seizing range, and moves them out of the seizing range and/or discharges them from further processing, which piece goods are being conveyed on the horizontal conveying device into the seizing range. Such removed or eliminated piece goods are fed appropriately to another transport branch or another processing branch and are no longer considered for the formation of the piece good layers.

Useful sensory detections in connection with the conveying of piece goods according to the method according to the invention are, for example, a longitudinal movement or a transverse movement of the piece goods. If these are, for example, designed to be cuboidal with a rectangular or otherwise shaped basis and different edge lengths, then any undesirable transverse position of 90 angular degrees will possibly remain unnoticed in the conveying sequence of a large number of conveyed piece goods; but such a transverse position is capable of considerably disturbing the layer formation process, because this transversely positioned piece good will very probably no longer fit into the position intended for it within the layer pattern.

In addition, in the case of such a transverse position of a single piece good within an uninterrupted row of many piece goods, which piece goods are being conveyed one behind the other on the horizontal conveying device to the grouping station and/or layer forming station, due to its deviating width this single transversely standing piece good can no longer be gripped without interference together with other piece goods by the gripping jaws of a correspondingly equipped manipulator, which gripping jaws can be advanced towards one another, but—depending on the deviation of its length or width from the adjacent piece goods rotated by 90°—either slips through when the gripping jaws of the manipulator are closed, because it is narrower than the adjacent piece goods, or allows the adjacent piece goods to slip through due to their deviating dimensions.

As a corrective for such a piece good, which is rotated by 90° with respect to the regular longitudinal lengthwise movement of the preceding and following piece goods, the manipulator can be controlled in such a way that it also seizes at least this individual twisted piece good individually and individually brings it into its target position and/or target alignment within the desired layer pattern, without further piece goods being seized and manipulated at the same time. Such a deviating manipulator control is possibly associated with a loss of time if, for example, in the normal sequence two or three piece goods would be seized and displaced and/or rotated simultaneously; but this can be taken into account, for example, with a corresponding overall control, in which sufficient reserves are present for a briefly accelerated manipulator movement in order to compensate for such disturbances. Equally possible is an at least brief deceleration of the horizontal conveying device, which horizontal conveying device is conveying the piece goods to the grouping station and/or layer forming station, in order to provide the manipulator with sufficient time to insert the individual twisted piece goods individually into the correct position within the layer pattern. A combination of both measures can also be useful.

A further useful sensory detection in connection with the conveyance of piece goods according to the method according to the invention is, for example, an angular positioning of the piece goods, i.e. their torsion about their respective vertical axis by an angle of rotation between zero and somewhat less than 90 angular degrees. If the piece goods are, for example, designed to be cuboidal with a rectangular or otherwise shaped basis and different edge lengths, each undesired rotation of the piece goods about their respective vertical axis will possibly go unnoticed in the conveying sequence of a large number of conveyed piece goods; but such a rotation is capable of considerably disturbing the layer formation process, because this piece good, which is not exactly aligned with the other piece goods, may no longer fit into the position provided for it within the layer pattern, but may possibly collide there with other piece goods.

In addition, in the case of such a torsion of an individual piece good about its vertical axis within an uninterrupted row of many piece goods, which piece goods are being conveyed one after the other on the horizontal conveying device to the grouping station and/or layer forming station, due to its oblique positioned longitudinal sides this individual piece good, which is rotated about its vertical axis, can no longer be gripped without interference together with other piece goods by the gripping jaws of a correspondingly equipped manipulator, which gripping jaws can be advanced towards each other, but—depending on the deviation of its alignment from the adjacent piece goods with their respective longitudinal sides aligned with each other—this piece good is either pressed into the aligned position with other piece goods when the gripping jaws of the manipulator are closed, because the gripping jaws rotate it into the intended position during the advancing movement. However, in this case the respective adjacent piece goods can easily be pushed apart, because the lateral edges of the piece good, which piece good is rotated when the gripping jaws of the manipulator are closed, follow a segment of a circle and hereby require more space than a piece good which is exactly aligned with the adjacent piece goods.

As a corrective for such a piece good, which piece good is rotated about its vertical axis by more than 0° and less than 90° with respect to the regular longitudinal lengthwise movement of the preceding and following piece goods, the manipulator can be controlled in such a way, that it also seizes at least this individual twisted piece good individually and individually brings it into its target position and/or target alignment within the desired layer pattern without simultaneously seizing and manipulating further piece goods. Such a deviating manipulator control is possibly associated with a loss of time if, for example, in the normal sequence two or three piece goods would be seized and displaced and/or rotated simultaneously; but this can be taken into account, for example, with a correspondingly adapted overall control, in which sufficient reserves are available for a briefly accelerated manipulator movement to compensate for such disturbances.

Equally, an at least brief delay of the horizontal conveying device is possible, which horizontal conveying device is conveying the piece goods to the grouping station and/or layer forming station, in order to give the manipulator sufficient time to back rotate the individual twisted piece good or to further rotate it by less than 90° and to insert them individually into the correct position within the layer pattern. A combination of the two measures mentioned can also be useful.

A further sensory detection in connection with the conveyance of piece goods according to the method according to the invention can, for example, detect a height and/or width and/or size and/or generally a volume of the piece goods, i.e. a possibly existing deviation of an actual dimension of individual or several piece goods from a desired dimension. If the piece goods are, for example, designed to be cuboidal with a rectangular or otherwise shaped basis and different edge lengths, then each undesired deviation in height and/or width from a desired dimension will possibly go unnoticed in the conveying process of a large number of conveyed piece goods; but such a deviation is potentially capable of considerably disturbing the layer formation process, because the individual piece goods, which are not exactly matching and/or aligning with the other piece goods, may no longer fit into the position provided for it within the layer pattern, but may possibly collide there with other piece goods.

Additionally, in the case of such a deviation in the dimensioning of an individual piece good, e.g. in its height and/or in its width, within an uninterrupted row of many piece goods being conveyed one after the other on the horizontal conveying device to the grouping station and/or layer forming station, that due to the longitudinal sides of the respective piece good not being exactly aligned with adjacent piece goods this individual wider or narrower and/or higher or lower piece good can no longer be handled without interference together with other piece goods by the gripping jaws of a correspondingly equipped manipulator, which gripping jaws can be advanced towards each other, but —depending on the deviation of its width from the adjacent piece goods with their respective longitudinal sides aligned with each other—it is either pressed into the aligned position with other piece goods and is thereby pressed together when the gripping jaws of the manipulator are closed, because the gripping jaws assume to seize a narrower piece good by their advancing movement. However, in this case the respective adjacent piece goods can easily slip downwards and are not gripped with sufficient reliability, for example, because their lateral edges remain further away from the gripping jaws than the lateral edges of the wider piece good when the gripping jaws of the manipulator are advanced. The reverse is also true for a narrower piece good, which can easily slip downwards out of the reciprocally advanced gripping jaws when gripped together with adjacent wider piece goods.

As a corrective for such a piece good deviating in its dimensions from the preceding and following piece goods, the manipulator can be controlled in such a way that it also individually seizes at least this individual piece good, which piece good is differently dimensioned, and moves it individually into its target position and/or target alignment in the desired layer pattern without simultaneously seizing and manipulating further piece goods. Such a deviating manipulator control is possibly associated with a loss of time if, for example, in the normal sequence two or three piece goods would be seized and displaced and/or rotated simultaneously, but this can be taken into account, for example, with a correspondingly adapted overall control, in which sufficient reserves are available for a briefly accelerated manipulator movement to compensate for such disturbances.

Depending on the classification of the deviating dimensions of individual piece goods, it may also be useful to eliminate them and to separate them from the layer formation process by corresponding manipulator controls and manipulator movements and to feed them, for example, to a collection vessel or to a discharging transport device such as a discharging horizontal conveying device. In this way, such eliminated piece goods can optionally be fed to further treatment steps and/or handling steps, which further steps will not be explained here in more detail.

In addition to an adapted manipulator control, an at least brief delay of the horizontal conveying device, which horizontal conveying device is conveying the piece goods to the grouping station and/or layer forming station, may be useful in order to give the manipulator sufficient time to separately seize the individual piece good and to individually insert it into the correct position within the layer pattern or to eliminate it from the layer formation process. A combination of the two mentioned measures can also be useful.

A further embodiment variation of a handling device and/or layer forming device according to the invention will be explained below, wherein the sensor device is formed by a mechanical scanning. The sensor device used in the embodiment variation described herein is essentially suitable for detecting the piece good width of the transported piece goods, whereby during the transport of the piece goods or when the piece goods are stopped, lateral guiding rails located on both sides of the transport path of the piece goods on the horizontal conveying device are advanced towards each other until the lateral surfaces of the piece goods are lightly touched by the guiding rails; this can be done in particular by detecting torques of actuators for the adjustable lateral guiding rails.

However, since in the event of such a touching contact the piece goods would be slowed down by the lateral guiding rails that have been advanced towards each other, it can be useful, preferably, to advance the lateral guiding rails towards the piece goods when the horizontal conveying device is stationary, and then to move them apart again by at least a small distance in order to allow the piece goods to pass unhindered between the lateral guiding rails during the subsequent conveying process and grouping process.

The further grouping process and/or layer formation process, in which the manipulator receives explicit information about at least a width of the piece goods to be handled, may be carried out in the manner described above. Normally, however, the further grouping process and/or layer formation process will preferably be carried out in each instance with piece goods of uniform size as well as equal alignment, since the mechanical scanning system proposed herein is not capable, after the initialization process, of detecting twisted, damaged or deviatingly dimensioned piece goods and of supplying the manipulator with corresponding control commands in order to take into account and compensate for such deviations in the layer formation process.

A special case of a piece good deviating in its dimensions from other piece goods may be a fallen over piece good, which deviating piece good is conveyed on the horizontal conveying device in a longitudinally, transversely or twisted lying position between preceding piece goods standing upright and subsequent piece goods standing upright and which deviating piece good possibly causes a more difficult or even impossible task for the manipulator during the layer formation process. Optionally, the sensory detection of fallen over piece goods in the method according to the invention may be considered as a special case of a detection of a height and/or width and/or size and/or in general a volume of the piece goods, because also a fallen over piece good shows a deviation of an actual dimension from a desired dimension. In particular, in the case of fallen over piece goods, such a deviation from a desired dimension is potentially capable of significantly disturbing the layer formation process, because the fallen over piece good generally does not fit into the position provided for it within the layer pattern, but is very likely to collide there with other piece goods.

In the case of fallen over piece goods a decision must therefore be made, as to whether they are to be eliminated directly without further inspection, i.e. whether they are to be eliminated from the conveying process without being fed into the layer formation process at all. However, depending on the size and shape of the piece goods to be brought into a stackable position, it may be useful to also handle fallen over piece goods in the manner described above, i.e. to first have the manipulator straighten them up in order to then integrate them into the layer formation process in the originally intended manner.

If a fallen over piece good is not to be eliminated, the manipulator can be controlled in such a way that it seizes at least this individual piece good individually, puts it in an upright position and then moves it individually into its target position and/or target alignment within the desired layer pattern, without other piece goods being seized and manipulated at the same time. Such a deviating manipulator control is possibly associated with a loss of time if, for example, in the normal sequence two or three piece goods would be seized and displaced and/or rotated simultaneously, but this can be taken into account, for example, with a correspondingly adapted overall control, in which sufficient reserves are available for a briefly accelerated manipulator movement to compensate for such disturbances.

In addition to the aforementioned adapted manipulator control, an at least brief delay of the horizontal conveying device, which horizontal conveying device is conveying the piece goods to the grouping station and/or layer forming station, may be useful in order to give the manipulator sufficient time to separately seize the individual piece good and to individually insert it into the correct position within the layer pattern or to eliminate it from the layer formation process. A combination of the two mentioned measures can also be useful.

A further mechanical parameter of the piece goods, which mechanical parameter can be detected by the sensor device, is the dimensional stability and/or external strength of the piece goods, which can be detected, in particular, by a sensor device which comprises a mechanical pushbutton or the like, the tactile element of which can measure, for example, the resilience of the outer piece goods packaging when a defined compressive force is applied to a lateral surface of the piece good, which piece good is passing the sensor device.

Since the piece goods to be positioned within a layer arrangement may be formed, for example, by liquid containers with relatively thin walls, such as PET beverage containers, or by cuboidal multi-component packagings with a flexible outer shell, a flexible packaging shell may be an indication of an improper filling, of a damage of the packaging or also of an incompletely filled packaging. Since such a packaging can be pressed in much more easily than a properly filled liquid container or beverage container, a suitably configured sensor device with a mechanical tactile element, which tactile element is interacting mechanically with an outer wall of the packaging, can be used to identify a defective packaging or an improperly filled container and preferably to eliminate it from the further conveying process and/or layer formation process.

Such elimination will generally be preferable to an insertion into the desired layer arrangement, since containers or packagings identified as defective or having defects cannot be brought into a perfect condition during the layer formation process, as is the case, for example, with containers or piece goods which are slantingly positioned or which have fallen over.

Furthermore, a useful application of the sensor device may be to detect the respective type of piece goods which is conveyed on the horizontal conveying device to the grouping station and/or layer forming station, since the piece goods are often provided with external markings such as barcodes, QR codes or the like, which may serve as carriers of numerous information, including information about different variants of piece good or types of beverage containers conveyed as piece goods.

Since it is desirable in many layer formation processes to produce so-called mixed layers by combining different types of piece goods in respectively definable mixing ratios, a detection of the respective type of piece good infeeding on the horizontal conveying device can be used for the respective control of the manipulator, so that the manipulator optionally moves the different types into the respectively intended target positions within the layer pattern or in that types of piece goods not intended for a respective layer are sorted out or fed to an adjacent grouping station and/or layer forming station.

Further applications are conceivable in connection with the detection of coded information on the piece good packaging.

In order to achieve the objectives defined above, in addition to the method explained in various embodiments, the present invention further proposes a handling device and/or layer forming device comprising at least one horizontal conveying device for conveying piece goods in rows from a packaging station and/or equipping station to a grouping station and/or layer forming station having a seizing range, which piece goods are distanced uniformly or differently from one another. The seizing range defines a movement range of at least one manipulator and/or limits the same in spatial terms. The at least one manipulator moving within the movement range is equipped and designed in such a way that it can seize at least one piece good by grasping the piece good from the at least one infeeding row and moving it into a defined relative target position and/or target alignment in a working cycle, in particular with regard to a piece good layer to be formed from a defined number of piece goods.

As was already described above in connection with the explanation of the method according to the invention, the seizing range of the grouping station and/or layer forming station referred to here not only defines the space into which the piece goods are being brought, but at the same time also forms a movement range for the at least one manipulator and/or limits this movement range of the at least one manipulator in spatial terms. By referring to this spatial limitation, in particular, a range or a sensible or constructively predetermined radius of movement of the manipulator is intended, which radius of movement cannot be exceeded or left by the manipulator due to its structural conditions, because, for example, its movable arm cannot reach beyond this space.

In the context of the present description of the invention, reference is also made quite generally to a manipulator. The term manipulator, which is consistently used herein, may refer in particular to a movably suspended gripper arm of a gantry robot, a multi-axis movable robot, a parallel kinematic robot or the like, which gripper arm is controllable within the defined movement range, wherein the gripper arm can in particular have gripping jaws, which gripping jaws can be advanced towards one another in order to grip, seize, displace, lift, rotate and bring individual piece goods, pairs or groups of piece goods into desired target positions and/or target alignments in order to release them there by opening the advanceable gripping jaws, and which gripping arm then moves to the piece goods to be subsequently manipulated.

In the handling device and/or layer forming device according to the invention, it is further provided that the horizontal conveying device arranged upstream of the grouping station and/or layer forming station in the transport direction of the piece goods has at least one sensor device for optical and/or electromagnetic wave-based and/or mechanical and/or other detection of positional data and/or dimensional data and/or alignment data with respect to the piece goods being transported on the horizontal conveying device.

Furthermore, it is provided that the sensor device generates electronic output signals from the positional data and/or dimensional data and/or alignment data obtained for the piece goods being transported on the horizontal conveying device and supplies this electronic output signals to a control device, where these electronic output signals are processed. The control device is designed and equipped in such a way that it controls the movements of the manipulator within the movement range for the purpose of layer formation from the piece goods supplied to the grouping station and/or layer forming station by the horizontal conveying device.

The arrangement of the sensor device within the region of the horizontal conveying device, on which horizontal conveying device the piece goods are transported in rows to the seizing range of the grouping station and/or layer forming station, enables the timely detection of piece goods which could possibly disturb or prevent the properly operating layer formation process, be it because of a tilted position of individual piece goods, be it because of fallen over piece goods or piece goods deviating in their outer contour or because of other deviations from a standard state or desired state. The time required by the piece goods on their conveying path between the sensor device and the manipulator acting within the seizing range is sufficient to adapt the manipulator control to the detected deviation from the standard as required and either to seize the piece good separately in accordance with its skewed position, torsion, lying condition (fallen over piece good), etc., or to eliminate the piece good, which piece good can no longer be integrated into the layer formation process, from the entire process and thus subject this piece good to a separate handling.

In principle, numerous technical embodiments are suitable as sensor devices, such as those that work with electromagnetic radiation and a detection of reflected radiation components. Likewise, the sensor system used can be based on image processing in the broadest sense, whereby the term image processing is to be understood broadly and can include not only electromagnetic radiation in the range which is visible to the human eye, but optionally also non-visible radiation components such as infrared radiation and/or ultraviolet radiation. Conceptually, moreover, electromagnetic radiation in the ultrasonic range can also be regarded as radiation suitable for image processing, since a sensor system equipped for this purpose can derive spatial data and positional data from the detection of ultrasonic waves reflected by the piece goods in the same way as from radiation in the visible wavelength range.

For example, the sensor device used within the device according to the invention may be formed by an optical detection device and/or by a sensor device that uses image processing to sense the piece goods conveyed on the horizontal conveying device and passing the sensor device. Optionally, this optical sensor device may comprise at least one camera and/or at least one line sensor.

In an alternative variation of the device according to the invention, the sensor device may optionally also be formed by a detection device and/or sensor device operating with ultrasound, which sensor device detects the piece goods conveyed on the horizontal conveying device and passing the sensor device by ultrasound signal processing.

However, in a further alternative variation of the device according to the invention, the sensor device can also scan the piece goods by mechanical means. For example, the sensor device can comprise at least one reflective scanner projecting into the transport path of the piece goods on the horizontal conveying device, so that the reflective scanner can detect and sense the piece goods conveyed on the horizontal conveying device and passing the sensor device.

An embodiment variation of the handling method and/or layer formation method according to the invention, in which the sensor device is formed by a mechanical scanning device, which mechanical scanning device is operating according to a completely different principle, shall be briefly explained below. The sensor device used in this method variation is essentially intended to detect a width of the piece goods, wherein during the transport of the piece goods or during an at least brief standstill of the piece goods lateral guiding rails located on both sides of the transport path of the piece goods on the horizontal conveying device are advanced towards one another, until the lateral surfaces of the piece goods are reached and lightly touched by the guiding rails, which can be done by detecting torques of actuators for the adjustable lateral guiding rails.

Since the piece goods would be slowed down if the lateral guiding rails, which guiding rails are advancing against each other, were to come into contact with the piece goods, the guiding rails are preferably advanced towards each other when the horizontal conveying device is at a standstill and then are moved apart again by at least a small distance in order to allow the piece goods to pass unhindered between the lateral guiding rails during the subsequent conveying process and grouping process.

The further grouping process and/or layer formation process can be carried out in the manner described above, but it is preferably carried out with piece goods of uniform size as well as the same alignment in each instance, since the mechanical scanning used here is not able to detect twisted, damaged or deviatingly dimensioned piece goods after the initialization process and to provide the manipulator with corresponding control commands in order to take into account and to compensate for such deviations during the layer formation process.

In order to give the control device sufficient time to process the output signals supplied by the sensor device and to generate adapted control commands for the manipulator during this time, the sensor device is arranged upstream of a transition region between the horizontal conveying device and the grouping station and/or layer forming station and sensibly at a sufficient distance, in order to keep sufficient time available for signal processing at normal transport speed of the piece goods.

In the device, it is provided, that the manipulator moves or displaces individual or a plurality of piece goods within the seizing range on the basis of the output signals obtained and processed by the sensor device and made available to a control device of the manipulator, so that positional deviations of individual piece goods can be detected in time and taken into account for adapted manipulator movements.

In this way, the manipulator can correct and/or change the positions of one or more of the piece goods that are being conveyed to the seizing range on the horizontal conveying device within the seizing range based on the output signals obtained and processed by the sensor device and provided to a control device of the manipulator.

Optionally, the device may also be equipped in such a way that the control device for controlling the movement of the manipulator is coupled to a controllable discharging device. Thereby, as required, based on the output signals obtained and processed by the sensor device and made available to a control device of the manipulator, individual or multiple piece goods that are being conveyed to the seizing range on the horizontal conveying device can be seized within the seizing range and can be removed from the seizing range and/or eliminated from further processing.

It should be expressly mentioned at this point that all aspects and embodiments which have been explained in connection with the handling device and/or layer forming device according to the invention equally relate to or may form partial aspects of the method according to the invention for handling and/or manipulating of piece goods moved in at least one row. Therefore, if at any point in the description or also in the claim definitions relating to the handling device and/or layer forming device according to the invention reference is made to specific aspects and/or interrelationships and/or effects, this equally applies to the method according to the invention. The same applies in reverse, so that all aspects and embodiments, which have been explained in connection with the method according to the invention for the treatment and/or the handling of piece goods moved in at least one row, also equally relate to or can be partial aspects of the handling device and/or layer forming device according to the invention. Therefore, if at any point in the description or also in the claim definitions relating to the method according to the invention reference is made to specific aspects and/or interrelationships and/or effects, this equally applies to the handling device and/or layer forming device according to the invention.

BRIEF DESCRIPTION OF THE FIGURES

In the following passages, the attached figures further illustrate exemplary embodiments of the invention and their advantages. The size ratios of the individual elements in the figures do not necessarily reflect the real size ratios. It is to be understood that in some instances various aspects of the invention may be shown exaggerated or enlarged to facilitate an understanding of the invention.

FIG. 2 shows in two schematic top views (FIG. 2A and FIG. 2B) a second embodiment of the handling device and/or layer forming device according to the invention for handling piece goods and for forming stackable piece good layers.

FIG. 3 shows in a schematic top view a third embodiment of the handling device and/or layer forming device according to the invention for handling piece goods and for forming stackable piece good layers.

FIG. 5 shows, in a further schematic plan view, a fifth embodiment of the handling device and/or layer forming device according to the invention for handling piece goods and for forming stackable piece good layers.

DETAILED DESCRIPTION OF THE INVENTION

Figure 1A:
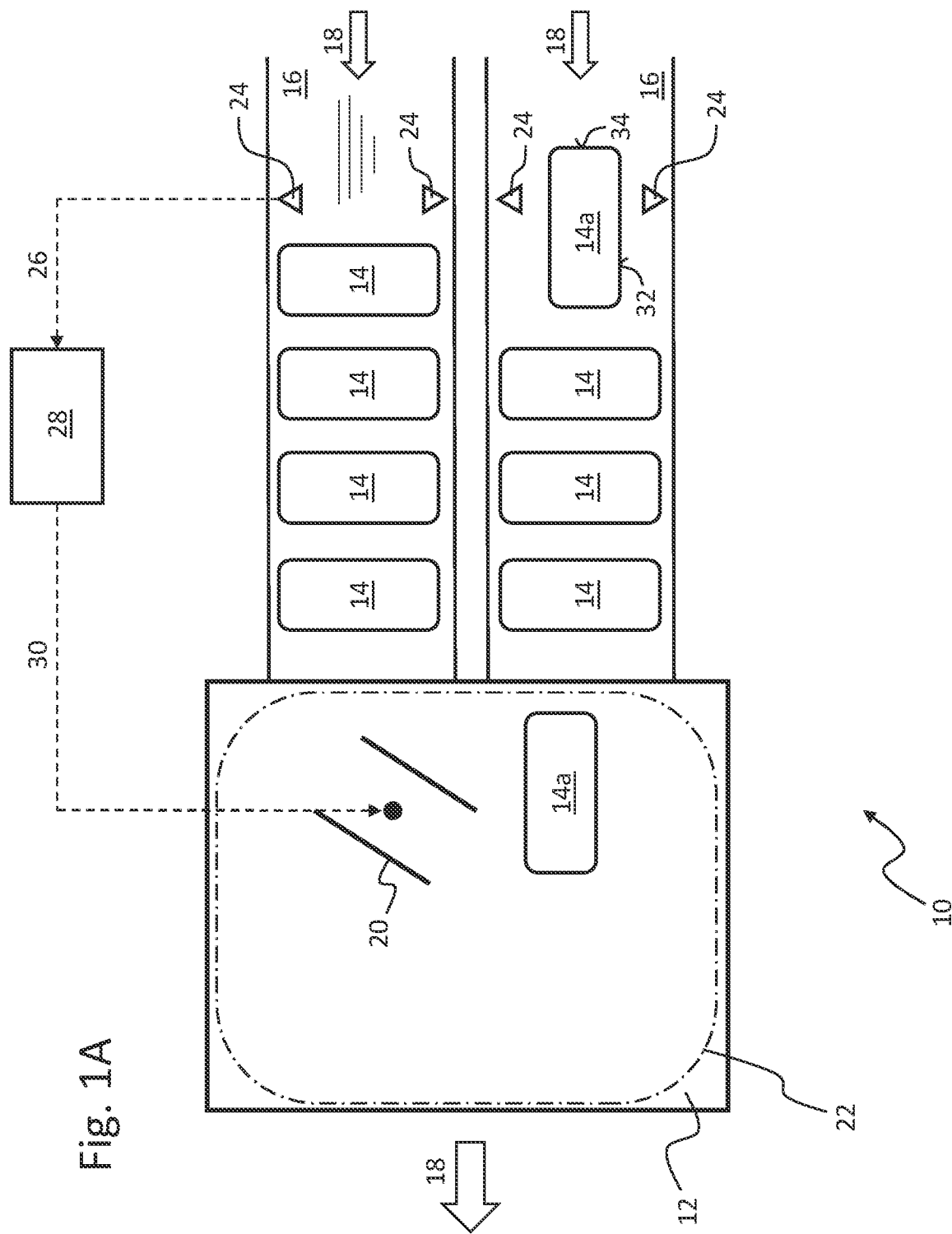
FIG. 1 shows in two schematic top views (FIG. 1A and FIG. 1B) a first embodiment of a handling device and/or layer forming device according to the invention for handling piece goods and for forming stackable piece good layers.

Identical reference signs are used in the figures described below for elements of the invention that are identical or have the same effect. Furthermore, and for the sake of clarity, only the reference characters relevant for describing the respective figure are provided. The embodiments shown are merely examples of how the invention may be executed and do not represent a conclusive limitation. Also, the features described below are in each instance not to be understood in close connection with further features of the respective embodiment, but can in each instance be provided or be used in the general context.

Figure 1B:
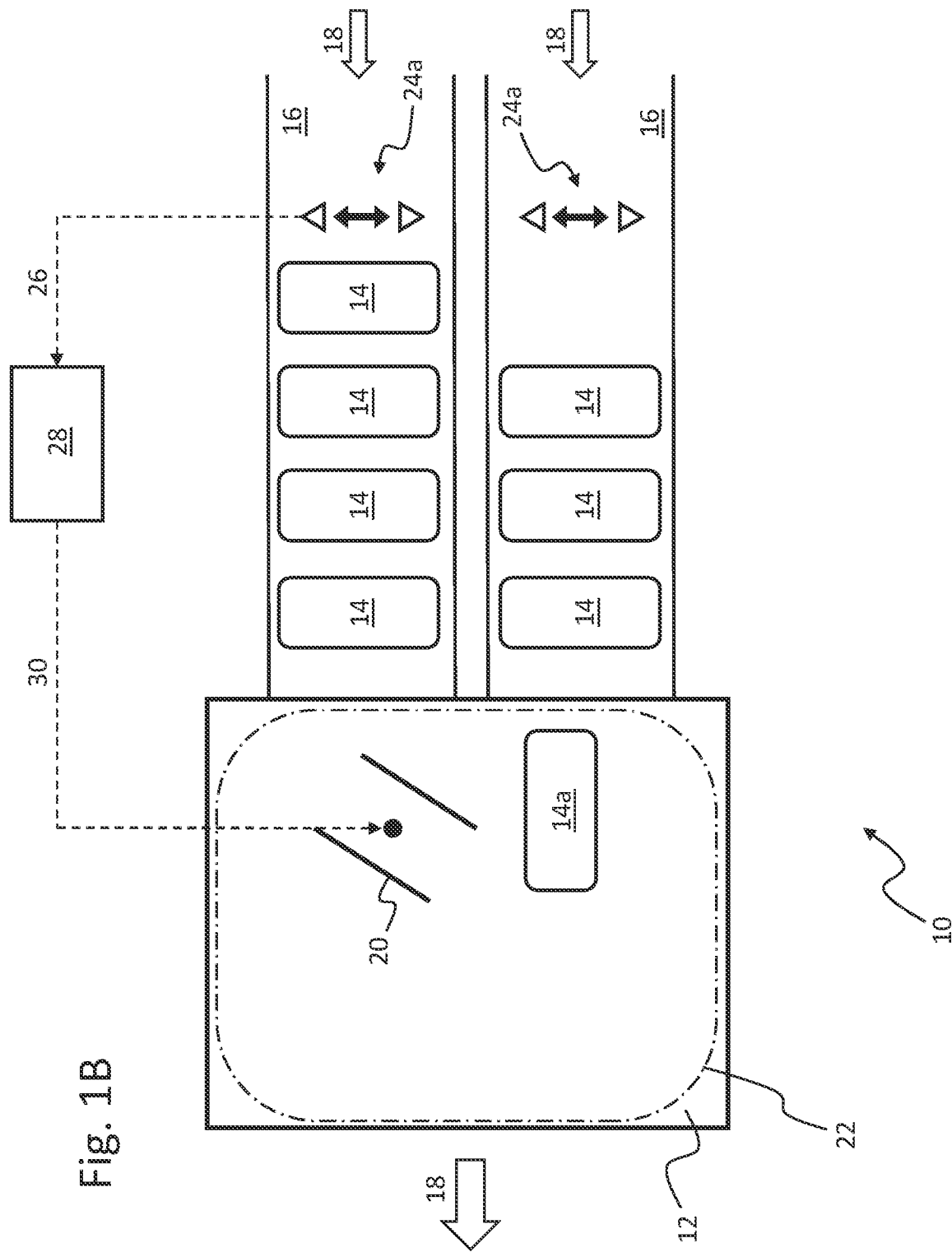

The schematic top views of FIGS. 1A and 1B show a first embodiment of a handling device and/or layer forming device 10 according to the invention, which has a grouping station and/or layer forming station 12 indicated herein by a large rectangle, in which piece goods 14, which are conveyed in a transport direction 18 to the grouping station and/or layer forming station 12 by two horizontal conveying devices 16 being arranged in parallel, are brought into a layer arrangement by a manipulator 20, which manipulator 20 is merely indicated schematically here, so that the layers of piece goods formed in this way can subsequently be conveyed in the transport direction 18 away from the station 12 and stacked several times one on top of the other (not shown here).

The piece goods 14 are each conveyed in a regular sequence with gaps between successive piece goods 14 on the two horizontal conveying devices 16, which horizontal conveying devices 16 run parallel and also convey in a parallel direction 18, and which horizontal conveying devices 16 may moreover be spaced a short distance apart. Optionally, the piece goods 14, which piece goods 14 are moved by the horizontal conveying devices 16, may each be spaced apart from each other by approximately the same or different distances within each row. However, the piece goods 14 can optionally also have variable distances from one another in the course of conveying.

The piece goods 14—which may be, for example, bundles of the most varied types—may, for example, have previously been packaged and/or printed on in a packaging station and/or equipping station before being fed by the two parallel horizontal conveying devices 16 to the grouping station and/or layer forming station 12, which grouping station and/or layer forming station 12 comprises a seizing range 22. The seizing range 22, which is characterized here by an interrupted line within the station 12, defines a movement range of the manipulator 20 and at the same time characterizes its spatially limited range, by which spatially limited range is meant that the manipulator 20 can reach and seize only those piece goods 14 which are located within the movement range of the seizing range 22.

The manipulator 20 is controlled in such a way that, in a working cycle, it seizes at least one piece good 14 in a gripping manner from one of the two rows infeeding in parallel and moves it into a defined relative target position and/or target alignment, in particular with respect to the respective piece good layer to be formed.

FIG. 1A as well as FIG. 1B both reveal that an own sensor device 24 is assigned to each of the two horizontal conveying devices 16 arranged upstream of the grouping station and/or layer forming station 12 in the transport direction 18 of the piece goods 14, the sensor devices 24 being provided for obtaining positional data and/or dimensional data and/or alignment data with respect to the piece goods 14 transported on the horizontal conveying devices 16. The sensor devices 24 generate electronic output signals 26 from the respectively obtained positional data and/or dimensional data and/or alignment data for the piece goods 14 being transported on the horizontal conveying devices 16. These output signals 26 are processed and used for controlling the manipulator 20 in a manner adapted to the detected piece good positions and/or piece good dimensions and/or piece good alignments, namely with respect to a respective piece good layer to be formed by the manipulator 20 (not shown here).

These sensor devices 24, which are respectively assigned to the two horizontal conveying devices 16, can in principle operate according to the most diverse measuring principles as shown according to the exemplary embodiment in FIG. 1A and FIG. 1B, whereby in particular such measuring principles can be usefully employed, which measuring principles are based on the transmission and reception of optical waves or generally of electromagnetic waves. A mechanical or otherwise suitable detection of positional data and/or dimensional data and/or alignment data of the piece goods 14 transported on the respective horizontal conveying device 16 is also conceivable, e.g. by the use of tactile elements or the like.

In order to be able to obtain useful control commands from the sensory detection of the piece good alignments and/or piece good positions for the manipulator 20 positioned downstream of the horizontal conveying devices 16, the sensor devices 24 generate respective electronic output signals 26 from the positional data and/or dimensional data and/or alignment data obtained for the piece goods 14 transported on the horizontal conveying devices 16, which output signals 26 are processed in a generally referred control device 28. The control device 28 can thus generate adapted control commands 30 for the manipulator 20, so that the latter can move and/or rotate and/or displace the respective piece goods 14 concerned within the seizing range 22 in a manner adapted to the desired layer pattern.

As illustrated by the schematic top views of FIG. 1A and FIG. 1B, the sensor devices 24 associated with each of the two horizontal conveying devices 16 can at least detect a rotation of the piece goods 14 by 90°. If, for example, cuboidal piece goods 14 with a rectangular basis are conveyed in the transport direction 18, wherein the respective longitudinal sides 32 of the piece goods 14 are facing one another in such a way that their respective narrow sides 34 are aligned with one another and are arranged parallel to the transport direction 18 and to the longitudinal extension directions of the respective horizontal conveying devices 16, then, in the case of a piece good 14a rotated by 90° as can be seen on the lower horizontal conveying device 16, the narrow sides 34 face the longitudinal sides of the preceding or following piece goods 14, while the longitudinal sides 32 of this twisted piece good 14a are arranged parallel to the transport direction 18 and to the longitudinal extension directions of the respective horizontal conveying devices 16.

When considering the twisted piece good 14a already located within the seizing range 22 of the manipulator 20 on the grouping station and/or layer forming station 12, it is immediately obvious that this piece good 14a, if necessary even together with one or two preceding or following piece goods 14, cannot be seized, rotated and/or displaced by the manipulator 20 in the same manner and according to the same criteria and thus brought into its target position for the layer arrangement to be formed from a plurality of positioned piece goods 14, because this would lead at least to problems in seizing the twisted piece good 14a, but normally also to disturbances in the layer formation process due to unexpected collisions with further piece goods 14.

For the aforementioned reasons, it is useful to detect such piece goods 14a rotated by 90° by the sensor device 24 already well before the piece goods 14, 14a enter the seizing range 22 of the manipulator 20 and to provide the manipulator 20 with modified control commands 30, which modified control commands 30 enable the manipulator 20 to seize such piece goods 14a separately, for example with gripping jaws also rotated by 90°, and to impose on the separately seized piece good 14a, for example, an additional rotation when approaching its target position, so that the separately seized piece good 14a does not collide with regularly positioned piece goods 14 and fits into the layer pattern of the other piece goods 14 in a desired manner. That is, with the modified control commands 30 the gripping and handling robot forming the manipulator 20 receives adapted movement curves and new gripping parameters, furthermore it may be useful to reduce the speed of movement of the robot forming the manipulator 20 at least during the separate handling of the piece good 14a rotated by 90°.

An additional option, which can be seen in FIG. 1B, may be to adapt the sensor device 24 to the piece goods 14 to be detected, in particular to their dimensions, so that it may be useful, for example, to be able to adjust the sensor device or parts of the sensor device transversely to the transport direction 18, so that the corresponding sensor elements used as sensor devices 24 can be positioned at a small distance from the piece goods 14 to be detected. Such an adjustment may be particularly useful for sensor elements that operate mechanically, such as tactile elements, but it may also have advantages for sensor elements that operate optically or with ultrasound.

In contrast, the embodiment shown in FIG. 1A illustrates an embodiment of the respective sensor device 24 with fixedly positioned sensor elements.

The sensor devices 24 shown in the embodiments according to FIG. 1A and FIG. 1B can be formed, for example, by light barrier elements, by relatively simply constructed line sensors or the like. As already mentioned, however, the sensor devices 24 can also comprise mechanical tactile elements or the like, which mechanical tactile elements come into touching contact with the piece goods 14, 14a transported past them.

In contrast, the schematic top views of FIG. 2A and FIG. 2B each illustrate a second embodiment variation of the handling device and/or layer forming device 10 according to the invention, in which the sensor device 24 is formed by at least one optical detection device 36, in particular by an electronically operating camera 38 with downstream image evaluation for the output signals 26, which output signals 26 are generated by the optical detection device 36 or by the camera 38. This is equally prepared and equipped for detecting twisted piece goods 14, in particular piece goods 14a rotated by 90°, and for generating corresponding output signals 26 from the captured images in order to be able to generate modified control commands 30 for the manipulator 20 with the aid of the downstream control device 28.

That is, with the control commands 30 that are modified on the basis of the image analysis the handling robot and/or grouping robot and/or layer forming robot forming the manipulator 20 receives adapted movement curves and new gripping parameters; wherein it may furthermore be useful to reduce the speed of movement of the robot forming the manipulator 20 at least during the separate handling of the piece good 14a rotated by 90°.

Optionally, a single optical detection device 36 or a single camera 38 may be associated with two parallel horizontal conveying devices 16, which are both entering the seizing range 22 of the manipulator 20 side by side (cf. FIG. 2A, FIG. 2B), the image processing of which single optical detection device 36 is capable of detecting the piece goods 14, 14a on both horizontal conveying devices 16. However, if a higher resolution image capture and/or a faster signal processing is desired, it may also be useful to assign a separate sensor device 24 in the form of a separate optical detection device 36 or a separate camera 38 to each available horizontal conveying device 16.

While FIG. 2A illustrates the already explained situation of a piece good 14a, which piece good 14a is rotated by 90° relative to other piece goods 14 on one of the two horizontal conveying devices 16, FIG. 2B shows a conveying situation in which at least one of the piece goods 14 transported on one of the horizontal conveying devices 16 shows a rotation about its vertical axis of less than 90°. The piece good, which is referred to here as twisted piece good 14b, is rotated in the illustrated embodiment of FIG. 2 by a rotation angle β of about 25° about its vertical axis in the direction of rotation to the right (in plan view of FIG. 2B from above); as a consequence of the image capture with the optical detection device 36 or the camera 38, the output signals 26 generated by the latter, the processing thereof in the control device 28 and the generation of control commands 30 for the manipulator 20 this must lead to correspondingly modified gripping parameters and adapted traversing curves or movement curves for the positioning of the piece good 14b concerned within the desired layer pattern.

An embodiment variation of a handling device and/or layer forming device 10 according to the invention is shown in the schematic top view of FIG. 3, in which the sensor device 24 is formed by a mechanical scanning 40, which a mechanical scanning 40 is operating according to a completely different principle. The sensor device 24 used in this case is essentially suitable for detecting the piece good width 42, whereby during the transport of the piece goods 14, lateral guiding rails 44 on both sides of the transport path of the piece goods 14 on the horizontal conveying device 16 are advanced towards one another until they lightly touch the lateral surfaces of the piece goods 14—in this case their narrow sides 34—which can be done by a detection of torques of actuators 46 of the adjustable lateral guiding rails 44.

Since a touching contact by the lateral guiding rails 44 that are advancing against each other would slow down the piece goods 14, these lateral guiding rails 44 are preferably advanced against each other when the horizontal conveying device 16 is stationary and then moved apart again at least by a small distance in order to allow the piece goods 14 to pass unhindered between the lateral guiding rails 44 during the subsequent conveying process and grouping process.

The further grouping process and/or layer formation process may proceed in the manner described above, but will preferably be performed with piece goods 14 of uniform size as well as the same alignment in each instance, since after the initialization process the mechanical scanning 40 used herein is not capable of detecting twisted, damaged or deviantly sized piece goods 14 and of providing appropriate control commands to the manipulator 20 to account for and to compensate for such deviations within the layer formation process.

Figure 4B:
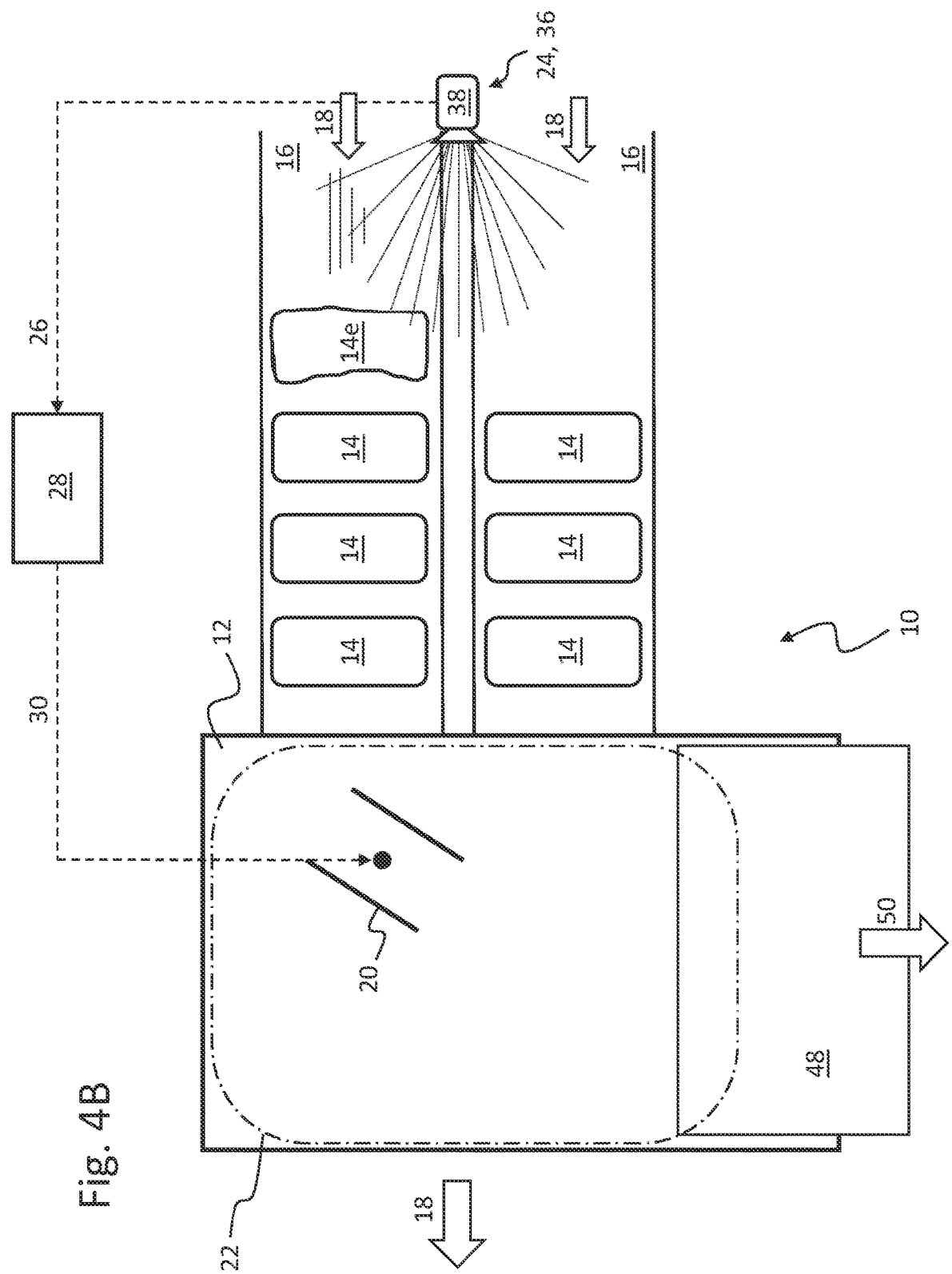
FIG. 4 shows in two schematic top views (FIG. 4A and FIG. 4B) a fourth embodiment of the handling device and/or layer forming device according to the invention for handling piece goods and for forming stackable piece good layers.

The schematic top views of FIGS. 4A and 4B each illustrate a further embodiment variation of the handling device and/or layer forming device 10 according to the invention, wherein in each instance a discharge area 48 is associated here with the grouping station and/or layer forming station 12, which discharge area 48 is for piece goods 14 that cannot be integrated into a layer formation process. The discharge area 48 is located at the edge of the seizing range 22 of the manipulator 20, so that the manipulator 20 can transfer individual piece goods 14, which piece goods 14 are not to be included in a respective layer formation process, into the discharge area 48, from which discharge area 48 they can be fed, for example, in an outfeeding conveying direction 50 perpendicular to the transport direction 18 to a separation or to a further handling, which separation or further handling need not be explained in more detail here.

According to the embodiment of the device 10 shown in FIG. 4A, the sensor device 24, which sensor device 24 is formed, for example, by an optical detection device 36 such as a camera 38, is prepared to detect deviating dimensions of individual or multiple piece goods 14, which individual or multiple piece goods 14 are transported on the horizontal conveying devices 16. Likewise, the sensor device 24 may be capable of detecting different types of piece goods and transmitting corresponding control commands 30 to the manipulator 20 in order to separate out piece good types and/or piece good sizes which are not to be integrated in the layer formation and to feed them to the discharge area 48; or, in order to form mixed piece good layers with different types of piece goods 14, to specifically select these and, for example, to move them to defined positions within the piece good layer.

The different dimensions of piece goods 14, 14c, 14d seen in the schematic top view of FIG. 4A are detected by the sensor device 24, so that the manipulator 20 receives suitable control commands 30 in each instance for seizing and manipulating these differently dimensioned piece goods 14, 14c, 14d in a custom fitted manner.

The sensor device 24 according to in the embodiment of the device 10 shown in FIG. 4B, which sensor device 24 is formed, for example, by an optical detection device 36 such as a camera 38, is prepared to detect erroneous outer contours and/or incorrect or undesirable dimensions of individual or several piece goods 14, 14e, which piece goods 14, 14e are being transported on the horizontal conveying devices 16. Since such damaged or erroneous piece goods 14e are not to be considered for a layer formation, they are preferably sorted out by an appropriate manipulator movement and fed to the discharge area 48.

The single erroneous or damaged piece good 14e, which damaged piece good 14e can be seen in the schematic top view of FIG. 4B and which follows two faultless piece goods 14 on the upper horizontal conveying device 16, is detected by the sensor device 24 in order that suitable control commands 30 can be transmitted to the manipulator 20 at the correct time for custom fittingly seizing and transferring this damaged piece 14e to the discharge area 48.

Furthermore, the schematic view of FIG. 5 illustrates a transport situation which has not yet been dealt with and which can be handled differently depending on the design of the manipulator 20. If individual piece goods 14f are transported lying on the horizontal conveying device 16 between preceding and following piece goods 14, while the preceding and following piece goods 14 are transported standing up, then it may, in particular, be a case of fallen over piece goods 14f, which fallen over piece goods 14f can either be set upright by the manipulator 20 within the seizing range 22 and made available to the layer formation process or which fallen over piece goods 14f can be separated out and fed to the discharge area 48.

However, a setting upright of such fallen over piece goods 14f is only useful if it is ensured that, apart from the deviating position of the concerned piece good 14f, it is an otherwise faultless piece good 14, 14f, which piece good can be integrated into the layer formation process without any problems. This can be done, if necessary, by a two-stage detection process with a suitably equipped sensor device 24, which sensor device 24 not only detects the position of the piece goods 14, 14f, but also detects other parameters such as those mentioned previously, for example, the dimensions, the types and/or packaging damages etc.

If, however, due to its equipment and its mobility the manipulator 20 is not at all capable of setting upright fallen over piece goods 14*f* within its seizing range 22 and to subsequently move them into a defined position and/or alignment within a piece good layer to be formed, the only remaining option is to eliminate such fallen over piece goods 14*f* and thus feed them directly to the discharge area 48.

The following is given as a supplementary note completing the above explanations. Although the figures generally refer to "schematic" representations and views, this does not mean that the figure representations and their description are of secondary importance with respect to the disclosure of the invention. The person skilled in the art is quite capable of obtaining enough information from the schematically and abstractly drawn representations to facilitate his understanding of the invention without being impaired in any way in his understanding, for example, by the drawn and possibly not exactly to scale proportions of the devices, their details or other drawn elements. Rather, the figures enable the skilled person as a reader to derive a better understanding of the idea of the invention formulated in a more general and/or abstract manner in the claims as well as in the general part of the description on the basis of the more precisely explained implementations of the method according to the invention and the more precisely explained structure of the device according to the invention.

The invention has been described with reference to preferred embodiments. To the skilled person it is also conceivable, however, to make changes and modifications without leaving the scope of protection of the appended claims.

List of Reference Numbers 10 handling device and/or layer forming device, device
12 grouping station and/or layer forming station, station
14 piece good
14*a* twisted piece good, piece good twisted by 90° (angle of rotation about the vertical axis approx. 90°)
14*b* twisted piece good, piece good twisted by less than 90° (angle of rotation about the vertical axis approx. 20° . . . 30°)
14*c* differently dimensioned piece good, narrower piece good
14*d* differently dimensioned piece good, smaller piece good
14*e* erroneous piece good, damaged piece good
14*f* fallen over piece good
16 horizontal conveying device
18 transport direction
20 manipulator
22 seizing range
24 sensor device
26 output signal, electrical output signal
28 control device
30 control command
32 longitudinal side (piece good)
34 narrow side (piece good)
36 optical detection device
38 camera
40 mechanical scanning
42 piece good width
44 lateral guiding rail
46 actuator
48 discharge area
50 outfeeding conveying direction
β rotation angle

The invention claimed is:

1. A method for the treatment or the handling of piece goods (14) moved in at least one row comprising:
feeding a plurality of piece goods (14) that have identical or different or variable distances from one another from a packaging station or equipping station or another upstream handling device or conveying device by at least one horizontal conveying device (16) to a grouping station or layer forming station (12) comprising a seizing range (22) that defines or spatially delimits a movement range of at least one manipulator (20),
seizing, with the at least one manipulator (20), in a work cycle, at least one piece good (14) and moving it into a target position or target alignment as part of forming to a piece good layer,
acquiring positional data or dimensional data or alignment data of the piece goods (14) that are being transported on the horizontal conveying device (16) with, wherein the sensor device (24) is an optical or electromagnetic wave-based or mechanical sensor device, and wherein the sensor device (24) performs a mechanical scanning (40) with adjustable lateral guiding rails (44) on both sides of a transport path of the piece goods (14) on the horizontal conveying device (16), wherein a piece good width (42) is determined by a detection of torques of actuators (46) during the advancement of the adjustable lateral guiding rails (44) towards one another towards lateral surfaces of the piece goods (14),
generating, with the sensor device (24), electronic output signals (26) from the positional data or dimensional data or alignment data obtained for the piece goods (14) that are being transported on the horizontal conveying device (16),
controlling the manipulator (20) in accordance with the output signals (26) to form a piece good layer.

2. The method of claim 1, wherein the sensor device (24) detects the piece goods (14) through image processing.

3. The method of claim 1, wherein the sensor device (24) detects the piece goods (14) through ultrasonic signal processing.

4. The method of claim 1, wherein the manipulator (20) moves or rotates or displaces individual or a plurality of piece goods (14) within the seizing range (22) based on the output signals (26).

5. The method of claim 4, wherein, based on the output signals (26) that are obtained and processed by the sensor device (24) and that are provided to a control device (28) of the manipulator (20), the manipulator (20) corrects or adjusts the positions of individual or multiple piece goods (14) within the seizing range (22).

6. The method according to claim 4, wherein, based on the output signals (26) that are obtained and processed by the sensor device (24) and that are provided to a control device (28) of the manipulator (20), the manipulator (20) seizes individual or multiple piece goods (14) within the seizing range (22) and removes them from the seizing range (22) or discharges them from further processing.

7. A handling device or layer forming device (10), comprising:
at least one horizontal conveying device (16) for conveying piece goods (14) in rows from a packaging station or equipping station or another upstream handling device or conveying device to a grouping station or layer forming station (12), wherein piece goods (14) are distanced uniformly or differently from one another, wherein the grouping station or layer forming station (12) has a seizing range (22) that defines or spatially delimits a movement range of at least one manipulator (20), wherein the at least one manipulator (20) can seize in a work cycle at least one piece good (14) from the at least one supplied row and move it into a target position or target alignment as part of forming a piece good layer, wherein the at least one horizontal conveying device (16), which is arranged upstream of the grouping station or layer forming station (12) in the transport direction (18) of the piece goods (14), has at least one sensor device (24) that is an optical or electromagnetic wave-based or mechanical sensor device, wherein the sensor device (24) generates electronic output signals (26) from the positional data or dimensional data or alignment data obtained for the piece goods (14) that are being transported on the horizontal conveying device (16) and wherein the sensor device (24) comprises adjustable lateral guiding rails (44) on both sides of a transport path of the piece goods (14) on the horizontal conveying device (16), wherein a piece good width (42) can be derived by detecting torques of actuators (46) for the adjustable lateral guiding rails (44), which output signals (26) are processed in a control device (28), which control device (28) controls the movements of the manipulator (20) for the purpose of the layer formation from piece goods (14).

8. The device of claim 7, wherein the sensor device (24) is an optical detection device or uses image processing to detect the piece goods (14).

9. The device of claim 7, wherein the sensor device (24) comprises at least one camera (38) or at least one line sensor.

10. The device of claim 7, wherein the sensor device (24) uses ultrasound to detects the piece goods (14).

11. The device of claim 7, wherein the sensor device (24) comprises at least one reflective scanner.

12. The device of claim 7, wherein the sensor device (24) is arranged upstream of a transition region from the horizontal conveying device (16) to the grouping station or layer forming station (12).

13. The devices of claim 7, wherein the control device (28) for controlling the movement of the manipulator (20) is coupled to a controllable discharging device.

14. The method of claim 1, wherein the seizing step comprises seizing in a gripping manner with the at least one manipulator (20).

15. The device of claim 7, wherein the manipulator (20) can seize the at least one piece good in a gripping manner.

* * * * *